United States Patent [19]

Krisko

[11] 4,198,219
[45] Apr. 15, 1980

[54] AIR INLET GRILLE FOR ENGINE COMPARTMENT

[75] Inventor: William J. Krisko, Eden Prairie, Minn.

[73] Assignee: The United States of America as represented by the Secretary of the Army, Washington, D.C.

[21] Appl. No.: 962,827

[22] Filed: Nov. 22, 1978

[51] Int. Cl.² ............................................. B01D 45/08
[52] U.S. Cl. ........................................ 55/440; 55/430; 55/435
[58] Field of Search .............. 55/440, 306, 430, 431, 55/435, 257 R, 257 PV

[56] References Cited

U.S. PATENT DOCUMENTS

| | | | |
|---|---|---|---|
| 2,816,658 | 12/1957 | Braun et al. | 55/435 X |
| 3,237,777 | 3/1966 | Brown et al. | 55/435 X |
| 3,368,332 | 2/1968 | Hooper et al. | 55/306 |
| 3,673,771 | 7/1972 | Dickey | 55/440 X |
| 3,970,439 | 7/1976 | Murphy | 55/440 X |
| 3,977,977 | 8/1976 | Kall | 55/440 X |
| 4,061,478 | 12/1977 | Hartwick | 55/440 X |
| 4,141,706 | 2/1979 | Regehr | 55/440 X |

*Primary Examiner*—Richard L. Chiesa
*Attorney, Agent, or Firm*—Nathan Edelberg; Robert P. Gibson; Peter A. Taucher

[57] ABSTRACT

An air inlet grille for an engine compartment of a military ground vehicle used in dusty atmospheres, e.g. the desert. The grille comprises a number of relatively thick air-guiding louvers of sinuous shape, each louver being relatively thick in the transverse direction so that the grille has ballistic properties, i.e. the ability to deflect or intercept enemy projectiles directed toward the engine disposed behind the grille. Each louver includes or contains a dust removal mechanism immediately downstream from each air-turn surface on the louver, whereby the grille is enabled to clean the dust-laden air, thereby preventing ambient dust from coating the engine and/or the air passages of engine coolers and radiators.

5 Claims, 3 Drawing Figures

U.S. Patent  Apr. 15, 1980  4,198,219
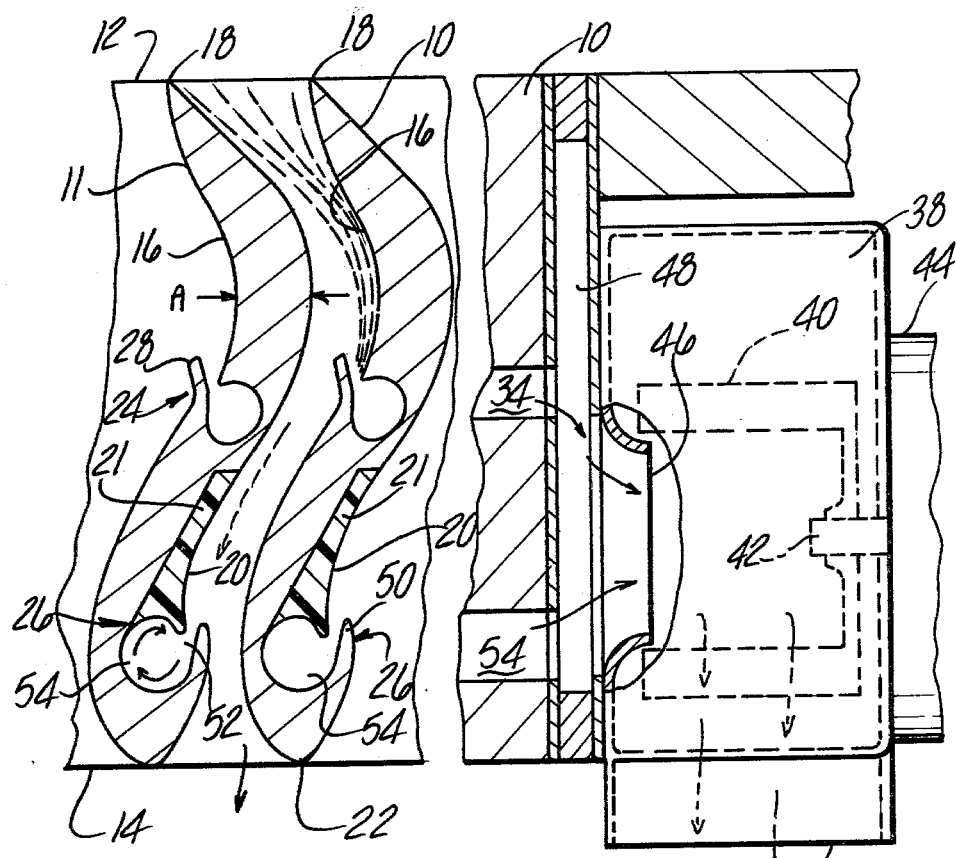
Fig-1
Fig-2
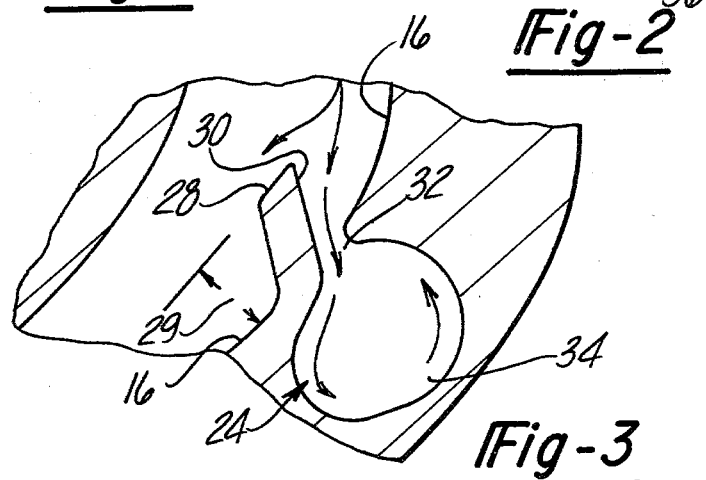
Fig-3

AIR INLET GRILLE FOR ENGINE COMPARTMENT

BACKGROUND AND SUMMARY OF THE INVENTION

It is known that grilles for engine compartments of military vehicles can have ballistic properties if the louvers in the grille are thickened in the transverse dimension. The present invention aims at providing a ballistic grille that also acts to remove a significant percentage of dust (or sand) entrained in the air flow through the grille. The invention, as a secondary objective, seeks to obtain the desired result while exerting a relatively low pressure drop in the air stream, and without unduly increasing the size of the grille, either the face area or the thickness in the direction of air flow.

The invention described herein may be manufactured, used, and licensed by or for the Government for governmental purposes without payment to me of any royalty thereon.

THE DRAWINGS

FIG. 1 is a sectional view taken through two adjacent vanes in a grille embodying this invention.

FIG. 2 is a fragmentary sectional view taken through one of the FIG. 1 vanes essentially at right angles to FIG. 1, and also illustrates a scavenger fan disposed at the lateral extremity of the vane.

FIG. 3 is an enlarged fragmentary sectional view showing a structural feature in the FIG. 1 vane.

Referring more particularly to FIG. 1, it is shown therein a grille for an engine compartment of a military vehicle, said grille comprising a number of similar vanes, two of which are shown at 10 and 11 in FIG. 1. The entire grille would include several additional vanes arranged in general parallelism to the illustrated vanes. Each vane is of a sinuous cross-section as shown in FIG. 1, whereby the passages defined by adjacent ones of the vanes exert turning action on the dusty air as it flows from the air entry face 12 of the grille toward the air exit face 14 of the grille. The number of vanes used in the grille is a function of the air requirements and grille face area. In a typical situation the grille would include twenty vanes, each having a length of about twenty inches. Each vane would have a transverse thickness, designated by dimension A of about ⅜ inch; the width of the defined passage between adjacent vanes would have a slightly lesser dimension, e.g. about ½ inch. The length of each vane in the direction of air flow (i.e. the distance between air inlet face 12 and air exit face 14) would be approximately 5½ inches.

Each sinuous vane is configured to define a first concave air-turn surface 16 near its leading edge or tip 18, and a second concave air-turn surface 20 near its trailing edge or tip 22. Each vane (10 or 11 in the drawing) has two dust removal mechanisms associated therewith. The first dust removing mechanism, designated by numeral 24, is disposed immediately downstream from air-turn surface 16; the second dust removal mechanism, designated by numeral 26, is disposed immediately downstream from the associated air-turn surface 20. Each dust removal mechanism includes a skimmer wall that projects from the general plane of the vane surface into the passage to intercept dust particles flowing along the surface of the vane. Each dust removal mechanism also includes a circular cavity within the vane in communication with the upstream face of the skimmer wall; a motor-powered scavenger fan (more particularly shown in FIG. 2) is in fluid communication with each circular cavity, whereby a suction condition is established at the upstream face of each skimmer wall. The system is designed to draw concentrated dust out of the main stream of dusty air as the air flows through the passage system from inlet face 12 of the grille toward exit face 14.

FIG. 3 illustrates dust removal mechanism 24 in greater detail than FIG. 1. The mechanism includes a skimmer wall 28 that projects from vane surface 16 so that the upstream face 30 of the skimmer wall is at an acute angle to the vane surface. Dust particles flowing along surface 16 impinge on skimmer wall surface 30; due to the acute angulation of surface 30 the dust particles are directed through a slot 32 into a generally circular cavity 34. The dust removal mechanism 24 extends the full length of the vane normal to the plane of FIG. 1, i.e. skimmer wall 28, slot 32, and cavity 34 extend the full length of the vane. A suction condition is established in each cavity 34 by means of a conventional centrifugal fan, designated by numeral 36 in FIG. 2. As there shown, the fan comprises a scroll housing 38 containing a conventional centrifugal fan wheel 40 suitably mounted on a shaft 42 driven by a conventional electric motor 44. Fan inlet 46 communicates with a manifold 48 located at one end of the vane system. In the complete system manifold 48 would extend normal to the vanes so that each cavity 34 is placed in fluid communication with the fan inlet 46; this disposition of the mechanism insures that a suction condition will be established at each one of the slots 32 (FIG. 3). The suction established at slot 32, in cooperation with the acute angulation of skimmer wall surface 30, will draw dust particles from the main stream into the cavity 34. Since the original direction of the dust-laden air is established by vane surface 16, the dust particles will enter cavity 34 in a generally tangential direction as designated by the arrows in FIG. 3. The swirling vortical movement will preferably be maintained as the fan 40 draws the concentrated dust from cavity 34.

Each one of the second-mentioned dust removal mechanisms 26 functions generally similarly to the mechanisms 24 shown in FIG. 3. As shown in FIG. 2, mechanism 26 includes a skimmer wall 50 projecting from the plane of vane surface 20 into the air passage to direct concentrated dust through a slot 52 into a circular cavity 54. The concentrated dust enters the cavity in a tangential direction to establish a swirling vortical condition in the cavity. Each cavity 54 communicates with the previously-mentioned manifold 48 and fan inlet 46 (FIG. 3) to thereby continuously remove concentrated dust from the main air passage defined between vanes 10 and 11.

It will be noted that each dust removal mechanism 24 or 26 is located immediately downstream from a concave air-turn surface 16 or 20. Each surface 16 or 20 intercepts the oncoming air-dust stream and effects an inertial migration of the dust particles toward the concave surface; the general action of surface 16 is denoted by the dashed lines in FIG. 1, which show how the dust particles change from a generally constant concentration at the inlet face 12 of the grille to a higher concentration on surface 16 (when the dust particles reach the dust removal mechanism 24). A similar action is produced by the concave air-turn surface 20, whereby dust particles are more easily captured by mechanism 26.

One influencing factor on grille performance is the sizing of scavenger fan 38 in relation to total air flow through the grille. It has been found that the best compromise between dust collection efficiency, satisfactory air flow, and reasonable power expenditure occurs when the scavenger flow is approximately ten percent of the total flow through the grille. If the scavenger flow is less than about five percent of the air flowing through the grille then the dust collection efficiency suffers. If the scavenger flow is more than ten percent of the air supplied to the grille then useful air flow suffers and fan power consumption increases without producing significant increase in dust collection efficiency. It is believed that best overall performance occurs when the scavenger fan extracts about ten percent of the primary air flow supplied to the grille. A useful range is five percent to ten percent.

Another influencing factor on performance is the width of slot 32 (or 52). Preliminary experimentation indicates that an optimum slot width is about 0.14 inch. The purpose of the slot is to establish a suction condition at the upstream face 30 of the skimmer wall; the suction effect should extend substantially to the tip of the skimmer wall and also for a significant distance upstream from surface 30 in order that the concentrated dust particles moving along surface 16 will be drawn toward slot 32 instead of passing with the mainstream around the tip of the skimmer wall. Apparently a slot width less than about 0.10 inch causes the suction effect to be localized to the space immediately adjacent surface 30; it is desirable that the suction zone extend forwardly (upstream) from surface 30 in order to exert a capturing force on the dust particles before they actually reach surface 30. It is believed that best overall performance is achieved when the width of slot 32 is in the range from 0.1 inch to 0.2 inch. Optimum width is thought to be about 0.14 inch.

Performance is further affected by the distance which skimmer wall 28 projects into the main passage; this distance is referenced by numeral 29 in FIG. 3. When the width of the main passage was about one half inch optimum performance was achieved with a skimmer wall projection (dimension 29) slightly less than one quarter inch. When the skimmer wall projected a lesser distance the collection efficiency suffered. When the skimmer wall projected a greater distance the pressure drop increased appreciably. On the basis of preliminary experimentation it is believed that optimum results are achieved when the skimmer wall projects into the main passage a distance that is in the range of 40% to 50% of the width of the passage.

It will be seen from FIG. 3 that skimmer wall surface 30 extends at an acute angle to air-guiding surface 16. This acute angulation of the skimmer wall surface is believed beneficial in minimizing possible rebound of the particles from surface 30 (as might occur if surface 30 were to extend at right angles to surface 16). Experimental work was performed with surface 30 acutely angled to surface 16 at an angle of about forty five degrees. The exact effect of varying the angle is not precisely known. However some acute angulation is believed desirable in order to minimize the aforementioned particle-rebound problem.

Each internal cavity 34 or 54 is preferably of generally circular configuration (although not necessarily an exact circle) in order to promote smooth non-turbulent vortical motion of dust particles within the cavity. The size of each cavity is not believed critical (within limits). However, in general it is believed that dust collection efficiency is improved by making each cavity as large as possible within limits dictated by the thickness of vane 10 or 11. With a vane thickness of about five eight inch it is feasible to make each cavity have a diameter slightly less than about one half inch.

It will be noted that each vane 10 or 11 has a leading tip or edge 18 that approaches a knife edge or chisel shape. Experimentation indicates that such a shape is important in attaining high dust collection efficiency. Test units wherein each vane had a blunt nose had significantly lower collection efficiencies than units wherein each vane had a chisel shaped nose. It is theorized that the chisel-shaped nose minimizes turbulence and air separation effects that would otherwise occur at or immediately downstream from a blunt nose. Such undesired turbulence interferes with the migration of dust particles toward vane surface 16 (as per the dashed lines in FIG. 1). Air separation effects are due to the necessary thickness of each vane (at least one half inch) required for ballistic performance of the grille. By forming each vane with a knife-like leading edge it is possible to maintain a thick vane cross-section without excessive turbulence or adverse effects on inertial separator action.

As regards ballistic performance of the grille, it is necessary that the component vanes be sufficiently close together to prevent line-of-sight paths for enemy projectiles through the vane spaces. Additionally each vane should have a pronounced sinuous character to put appreciable metal in the path of each enemy projectile. A pronounced (large amplitude) sinuosity also increases the dust migration action of each gas-turn surface 16 or 20; however if the air-turn action is too abrupt or extreme then the pressure drop across the grille will be excessive. Ballistic performance of the grille may be somewhat improved if parts of the grille are formed of relatively soft material that is capable of capturing ricochetting ballistic projectiles. As shown in FIG. 1, air-turn surface 20 is formed by a relatively soft plastic insert 21 in the vane; projectiles moving toward surface 20 tend to imbed within the plastic rather than passing through the grille toward the engine.

The grille of this invention may be formed of aluminum or steel or other metal having desired ballistic properties. Preferably each vane 10, 11 etc. is formed separately as an extrusion to the cross sectional configuration shown in FIG. 1. Preferably the thickness of the grille (distance between faces 12 and 14) is between five and six inches. Each vane is formed with two air-turn surfaces 16 and 20. A dust removal mechanism 24 or 26 is located immediately downstream from each air-turn surface. Each dust-removal mechanism for a given vane communicates with a different surface of the vane. Thus, in the structure illustrated in FIG. 1 each dust-removal mechanism 24 communicates with the left face of the vane; each dust removal mechanism 26 communicates with the right face of the vane. Such an arrangement enables a relatively large number of dust-removal mechanisms to be incorporated in a relatively thin grille.

It will be understood that some variation in structure, size, configuration and proportioning of parts may be resorted to without departing from the spirit of the invention as defined in the attached claims.

I claim:

1. In a military vehicle having an engine compartment: the improvement comprising an air inlet grille positioned on the vehicle to remove dust particles from air flowing into the engine compartment; said grille comprising a series of sinuous vanes arranged in spaced parallel relation to define S-shaped air passages; each vane having a chisel-shaped leading edge (18), a rounded convergent trailing edge (22), and two reversely curved side surfaces extending from the leading edge to the trailing edge; each vane being a solid non-hollow structure that is approximately five eighth inch thick measured across the vane side surfaces, whereby grille integrity is maintained when enemy projectiles are directed thereagainst; the vanes being spaced so that the defined air passages have slightly less transverse thicknesses than the vanes; one side surface of each vane comprising a first curved concave air-turn surface (16) extending from the vane leading edge and a curved convex surface extending from the air-turn surface to the vane trailing edge; the other side surface of each vane comprising a curved convex surface extending from the vane leading edge and a second curved concave air-turn surface (20) extending from the last-mentioned convex surface to the vane trailing edge; each vane having a first internal cavity (34) at the downstream end of the first concave air-turn surface, and a second internal cavity (54) near the downstream end of the second concave air-turn surface; a slot communicating each cavity with the immediately adjacent concave air-turn surface; a skimmer wall projecting from the vane at the downstream edge of each slot to deflect concentrated dust through the slot into the associated cavity; the upstream face of each skimmer wall being at an acute angle to the associated air-turn surface to guide dust particles into the slot; each skimmer wall projecting from the vane surface into the adjacent passage through a distance (29) that is in the range of 40% to 50% of the passage width; each slot having a width that is in the range from one tenth inch to two tenth inch; and scavenger fan means connected to each cavity for applying a suction force on each of the associated slots.

2. The improvement of claim 1 wherein each slot has a width that is approximately 0.14 inch.

3. The improvement of claim 1 wherein the projection of each skimmer wall into the adjacent passage is approximately 40% of the passage width.

4. The improvement of claim 1 wherein each vane is metal, except that the second air-turn surface on each vane is defined by a relatively soft plastic insert of sufficient thickness to imbed ricocheting ballistic fragments therein.

5. The improvement of claim 1 wherein each cavity has an approximately circular cross-sectional configuration devoid of shape internal corners that would otherwise impede swirling motion of concentrated dust toward the scavenger fan means.

* * * * *